(12) United States Patent
Schattmaier et al.

(10) Patent No.: US 10,524,027 B2
(45) Date of Patent: Dec. 31, 2019

(54) SENSOR BASED SYSTEM AND METHOD FOR PREMISES SAFETY AND OPERATIONAL PROFILING BASED ON DRIFT ANALYSIS

(71) Applicant: TYCO FIRE & SECURITY GMBH, Neuhausen am Rheinfall (CH)

(72) Inventors: Steve Schattmaier, Dana Point, CA (US); Tracie Adkins, Hoover, AL (US); Paul B. Rasband, Fremont, CA (US); Richard Campero, Gilroy, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 16/048,428

(22) Filed: Jul. 30, 2018

(65) Prior Publication Data

US 2018/0367873 A1 Dec. 20, 2018

Related U.S. Application Data

(63) Continuation of application No. 15/477,213, filed on Apr. 3, 2017, now Pat. No. 10,051,349.
(Continued)

(51) Int. Cl.
*H04Q 9/00* (2006.01)
*G06N 20/00* (2019.01)
(Continued)

(52) U.S. Cl.
CPC .............. *H04Q 9/00* (2013.01); *G06N 5/046* (2013.01); *G06N 20/00* (2019.01); *G08B 25/10* (2013.01);
(Continued)

(58) Field of Classification Search
CPC combination set(s) only.
See application file for complete search history.

(56) References Cited

U.S. PATENT DOCUMENTS

2002/0057342 A1* 5/2002 Yoshiyama ...... G08B 13/19634
348/153
2004/0150521 A1 8/2004 Stilp
(Continued)

FOREIGN PATENT DOCUMENTS

| EP | 2 801 942 A1 | 11/2014 |
|---|---|---|
| EP | 2 882 159 A1 | 6/2015 |
| WO | WO-2015/112892 A1 | 7/2015 |

OTHER PUBLICATIONS

International Search Report and Written Opinion for International Application No. PCT/US17/25839, dated Jul. 18, 2017, 10 pages.
(Continued)

*Primary Examiner* — Thomas S McCormack
(74) *Attorney, Agent, or Firm* — Foley & Lardner LLP

(57) ABSTRACT

A system includes plural sensor devices installed at a premises and a server computer coupled to a network and in communication with a gateway, which receives a risk profile for a physical premises, collect sensor information from the plural sensor devices and receives data feeds relevant to a location of the physical premises and execute one or more learning models to continually analyze the collected sensor information and data feeds to produce operational decisions based on the sensor information and data feeds to predict changes to risk profiles based on the continual analysis of sensor information and which determines responses to new risk profiles that are produced. The system also includes an engine for monitoring the sensor devices to recognize occurrences of events, and ask, through an interface to a human for additional information to confirm an occurrence of one or more of the events.

20 Claims, 9 Drawing Sheets

Related U.S. Application Data

(60) Provisional application No. 62/318,291, filed on Apr. 5, 2016.

(51) Int. Cl.
  *G06Q 10/06* (2012.01)
  *G08B 13/00* (2006.01)
  *G08B 25/10* (2006.01)
  *G08B 31/00* (2006.01)
  *G06N 5/04* (2006.01)
  *G08B 19/00* (2006.01)

(52) U.S. Cl.
  CPC .............. *G08B 31/00* (2013.01); *G08B 19/00* (2013.01); *H04Q 2209/43* (2013.01)

(56) References Cited

U.S. PATENT DOCUMENTS

| | | |
|---|---|---|
| 2005/0216302 A1 | 9/2005 | Raji et al. |
| 2006/0226971 A1 | 10/2006 | Petricoin et al. |
| 2008/0224862 A1* | 9/2008 | Cirker .............. G08B 13/19652 340/540 |
| 2009/0279734 A1 | 11/2009 | Brown |
| 2013/0006676 A1 | 1/2013 | Helitzer et al. |
| 2015/0248297 A1 | 9/2015 | Rasband et al. |
| 2015/0347902 A1 | 12/2015 | Butler et al. |
| 2016/0036944 A1 | 2/2016 | Kitchen et al. |

OTHER PUBLICATIONS

European Extended Search Report for EP Application No. 17779613.3 dated Aug. 30, 2019, 10 pages.

\* cited by examiner

SENSOR BASED SYSTEM AND METHOD FOR PREMISES SAFETY AND OPERATIONAL PROFILING BASED ON DRIFT ANALYSIS

CLAIM OF PRIORITY

This application claims priority under 35 U.S.C. § 119(e) to provisional U.S. Patent Application 62/318,291, filed on Apr. 5, 2016, entitled: "Sensor Based System And Method For Premises Safety And Operational Profiling Based On Drift Analysis" the entire contents of which is incorporated herein by reference.

BACKGROUND

This description relates to operation of sensor networks such as those used for security, intrusion and alarm systems installed on industrial or commercial or residential premises.

It is common for businesses to have various types of systems such as intrusion detection, fire detection and surveillance systems for detecting various alarm conditions at their premises and signaling the conditions to a monitoring station or authorized users. Other systems that are commonly found in businesses are access control systems have card readers and access controllers to control access, e.g., open or unlock doors, etc. These systems use various types of sensor devices such as motion detectors, cameras, and proximity sensor devices, thermal, optical, vibration sensor devices and so forth.

SUMMARY

Companies develop, deploy, monitor and service various types of such equipment for controlling access to and for protecting physical premises, such as buildings and other physical areas, such as storage yards, etc. Equipment employed include fire protection products, intrusion products, video surveillance products, access control products, etc. Those products typically are accessed via a dedicated panel that resides in the building or via a remote application such as on a mobile device.

According to an aspect, a computer program product tangibly stored on a computer readable hardware storage device, the computer program product for detecting conditions at a physical premises, the computer program product comprising instructions to cause a processor to receive a risk profile for a physical premises, collect sensor information from plural sensor devices deployed in the premises, with the sensor devices configured with an identity of the premises and physical objects being monitored by the sensor devices in the identified premises, receive data feeds relevant to a location of the physical premises, execute one or more learning models to continually analyze the collected sensor information and data feeds to produce operational decisions based on the sensor information and data feeds, predict changes to the risk profile based on the continual analysis of sensor information, determine a new risk profile for the physical premises based on the predicted changes, determine responses to the new risk profile, retrieve a group of premises that contains a listing of premises with a determined affinity in shared characteristics among the premises, and determine whether to send the determined responses to systems associated with the premises listed in the retrieved group of premises according to the determined affinity.

Additional aspects include systems and methods.

Additional features of the computer program product, systems and methods may include other features and have advantages disclosed herein.

The details of one or more embodiments of the invention are set forth in the accompanying drawings and the description below. Other features, objects, and advantages of the invention is apparent from the description and drawings, and from the claims.

DETAILED DESCRIPTION

Described herein are surveillance/intrusion/fire/access systems that are wirelessly connected or to a variety of sensor devices. In some instances, those systems maybe wired to sensor devices. Examples of detector/sensor devices (sensor/detector being used interchangeably herein) include sensor devices that detect/sense general physical/chemical/biological conditions. Examples of detector/sensor devices include motion detectors, glass break detectors, noxious gas sensor devices, smoke/fire detectors, contact/proximity switches, video sensor devices such as cameras, audio sensor devices such as microphones and directional microphones, temperature sensor devices such as infrared sensor devices, vibration sensor devices, air movement/pressure sensor devices, chemical/electro-chemical sensor devices, e.g., VOC (volatile organic compound) detectors, etc. In some instances, those systems may have sensor devices that are weight sensor devices, LIDAR (technology that measures distance by illuminating a target with a laser and analyzing the reflected light), GPS (global positioning system) receivers, optical, biometric sensor devices, e.g., retina scan sensor devices, EGG/Heartbeat sensor devices in wearable computing garments, network hotspots and other network devices, and others.

More specifically, at least some of the sensor devices that are deployed are of a type whose operation can be modified during specific events or conditions. In addition, processing can also combine certain sensor types referred to above to provide various complex results. Thus, combining sensor types such as video surveillance, Bluetooth® or other near field beacon detection, access control, fire detection, weapon detection, license plate recognition, facial recognition, gunshot recognition, aggravated event sound detection, automated sound recording by employee phones in the event of an emergency, etc., can result in occupancy/presence detection, of specific individuals.

Some sensor devices are configured to monitor the status of other sensor devices. For example, a sensor device could monitor the status of video surveillance cameras so that a cloud application (discussed below) is immediately informed when one or more sensor devices, e.g., the video surveillance camera malfunctions. Upon processing in the cloud application (discussed below), the cloud application produces an operational decision that is to immediately generate a message to a designated system/device to dispatch a security maintenance provider to service the affected malfunctioning sensor.

Figure 1:
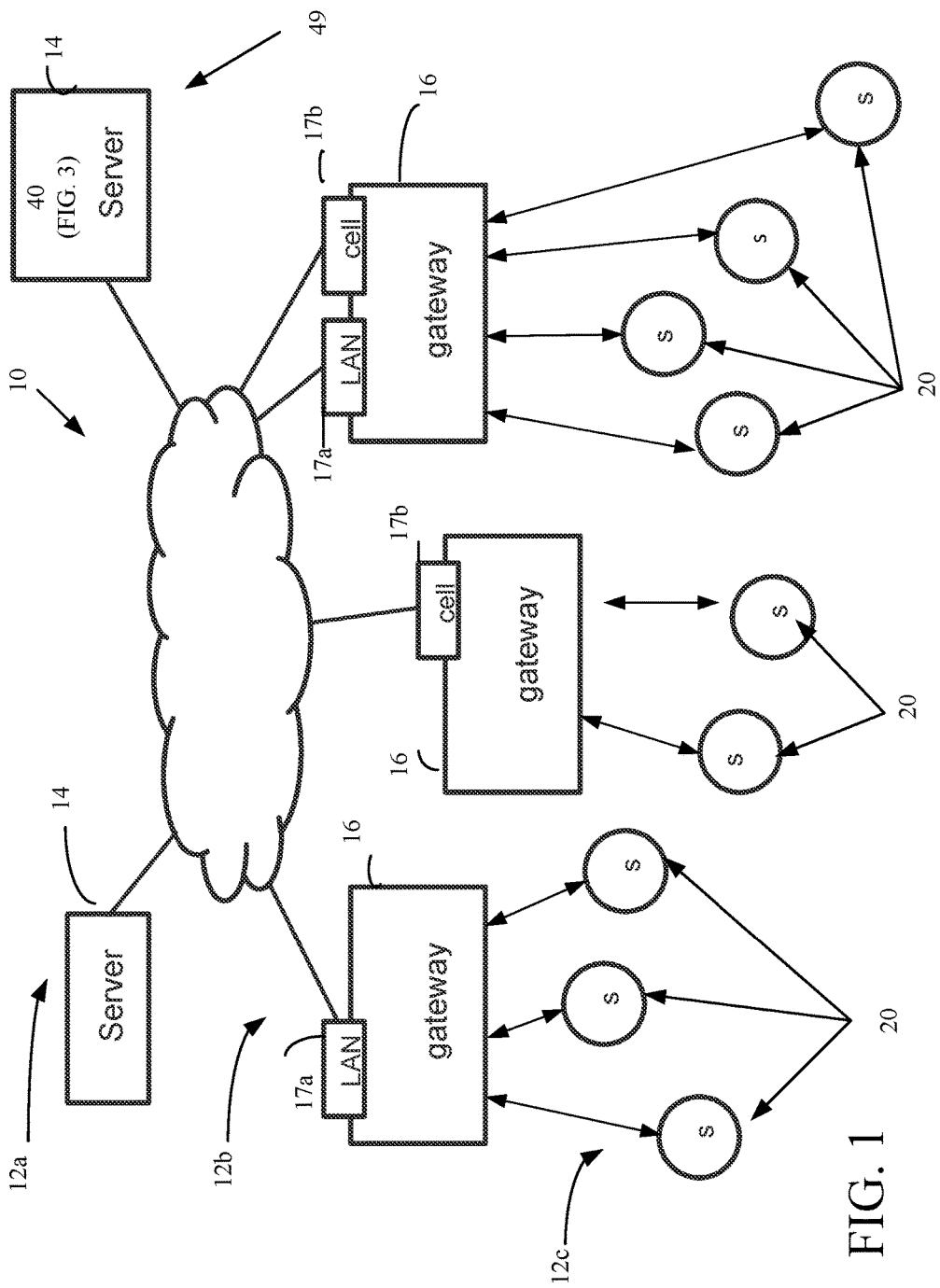
FIG. 1 is a schematic diagram of an exemplary networked security system.

Referring now to FIG. 1, an exemplary (global) distributed networked arrangement 10 for surveillance/intrusion/fire/access systems using wirelessly deployed sensor devices (generally 20) is shown. In FIG. 1, the wireless distributed networked arrangement 10 is logically divided into a set of tiers or hierarchical levels 12a-12c. The surveillance/intrusion/fire/access systems employ these wireless sensor networks (not numbered) and wireless devices 20, with remote, cloud-based server monitoring and report generation via level 12a. As described in more detail below, the wireless sensor networks provide wireless links (illustrated but not numbered) between sensor devices and servers via the second level 12b, with the wireless links usually used for the lowest level connections (e.g., sensor node devices to hub/gateway connections).

In an upper tier or hierarchical level 12a of the network are disposed servers and/or virtual servers 14 running a "cloud computing" paradigm that are networked together using well-established networking technology such as Internet protocols or which can be private networks that use none or only part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below. In one implementation, hierarchical level 12a includes a central monitoring station 49 comprised of one or more of the server computers 14 and which includes or receives information from a sensor based state prediction system 50 as will be described below.

The distributed networked arrangement 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b. The distributed networked arrangement 10 also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F"), as well as wireless sensor nodes or sensor end-nodes 20 (marked in the FIG. 1 with "C"). In some embodiments, wired sensor devices (not shown) can be included in aspects of the distributed networked arrangement 10.

In the lower tier 12c (wirelessly-connected tier) are the sensor devices 20 that provide specific sensor functions. At least some of these sensor devices 20 have a processor and memory, and may be battery operated and include a wireless network card. Others may be wired directly into the middle tier or to other nodes in the lower tier. The edge devices generally form a single wireless network in which each end-node communicates directly with its parent node in a hub-and-spoke-style architecture. The parent node may be, e.g., a network access point (not to be confused with an access control device or system) on a gateway or a sub-coordinator which is, in turn is connected to the access point or another sub-coordinator.

In a typical implementation, the edge (wirelessly-connected) tier 12c of the distributed networked arrangement 10 is largely comprised of devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional sensor node or "F" sensor node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

In some instances, the sensor devices 20 are sensor packs (discussed below), which are configured for a particular types of business applications, whereas in other implementations the sensor devices are found in installed systems such as the example security systems discussed below.

Figure 2:
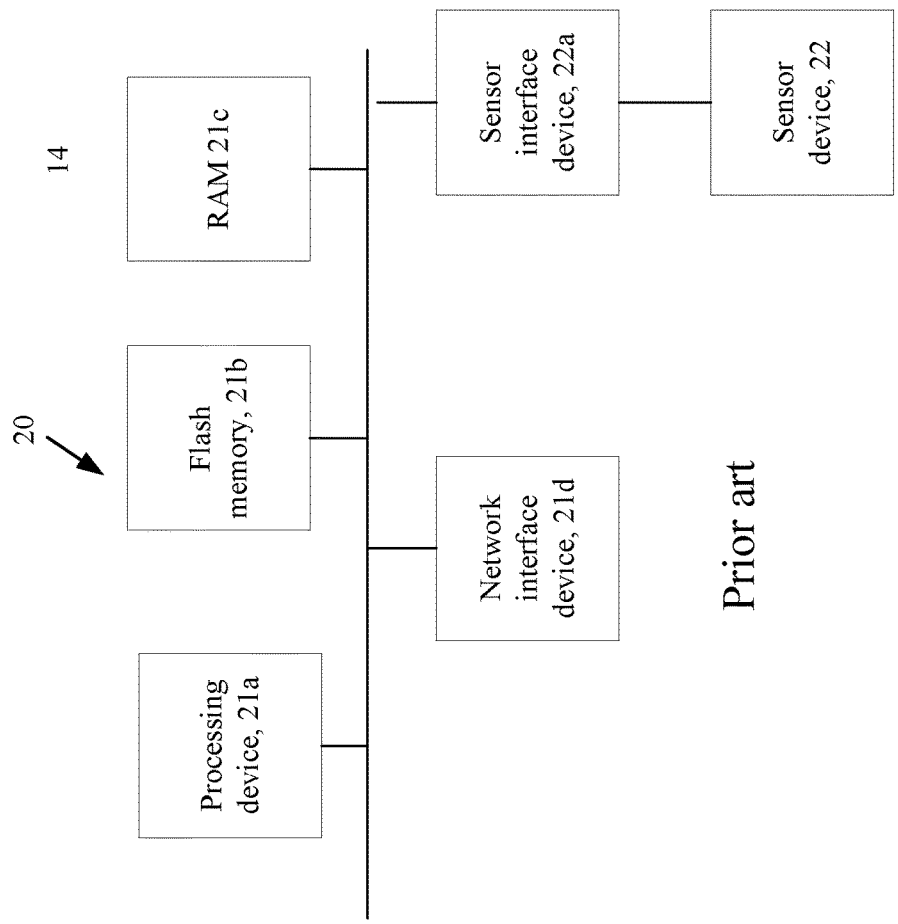
FIG. 2 is a block diagram of a generic, typical sensor that includes computer processing capabilities.

Referring to FIG. 2, a typical configuration for a sensor device 20 is shown. Sensor device 20 includes a processor device 21a, e.g., a CPU and or other type of controller device that executes under an operating system, generally with 8-bit or 16-bit logic, rather than the 32 and 64-bit logic used by high-end computers and microprocessors. The device 20 has a relatively small flash/persistent store 21b and volatile memory 21c in comparison with other the computing devices on the network. Generally, the persistent store 21b is about a megabyte of storage or less and volatile memory 21c is about several kilobytes of RAM memory or less. The device 20 has a network interface card 21d that interfaces the device 20 to the network 10. Typically, a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The device 20 also includes a sensor element 22 and a sensor interface 22a that interfaces to the processor 21a. Sensor 22 can be any type of sensor types mentioned above. As understood, the sensor element 22 is the physical structure or device that actually senses the actual physical/chemical/biological condition. The notion of a sensor element could include rather simple devices such as a contact switch or more complex devices such as a camera with optics and light sensor arrays, as well as certain processing functions. Thus, it is not necessary to demarcate an exact line between the sensor element and other parts of the sensor device.

In some implementations, a pre-set suite of fixed/mobile sensor packs (discussed below) are used. These pre-set suite(s) of fixed/mobile sensor packs are especially selected for particular applications according to processing that is discussed below. In any event, either individual sensor devices conventionally deployed throughout a premises or one or more pre-set suite of fixed/mobile sensor packs are used.

Applications of a security system can be an intrusion detection system and access control system installed at a premises (not shown). The premises could be a commercial premises, but may alternatively be any type of premises or building, e.g., industrial, residential, etc. The intrusion detection system could include an intrusion detection panel and would include the sensor devices/detectors 20 (FIGS. 1, 2) disbursed throughout the premises that would be in communication with the panel and the central monitoring station 49 (also referred to as central monitoring center) via communication networks, such as the Internet, as discussed above or a phone system or cellular communication system being examples of others. An exemplary intrusion detection panel 38 includes a processor and memory, storage, a key pad and a network interface card (NIC) coupled via a bus (all not shown).

The sensor/detector devices may be hard wired or communicate with the intrusion detection panel wirelessly. Some or all of sensor/detectors 20 communicate wireless with the intrusion detection panel and with the gateways. In general, detectors sense glass breakage, motion, gas leaks, fire, and/or breach of an entry point, and send the sensed information to the intrusion detection panel. Based on the information received from the detectors 20, the intrusion detection panel determines whether to trigger alarms and/or sending alarm messages to the monitoring station. A user may access the intrusion detection panel to control the intrusion detection system, e.g., disarm, arm, enter predetermined settings, etc.

A dispatch center that in this example is part of the central monitoring station 49 includes personnel stations (not shown), server(s) systems 14 running a program that populates a database (not shown) with historical data. The central monitoring station 49 also includes the sensor based state prediction system 50.

Applications of a security system can be an access control system installed in premises, and which would include access controller card readers, door locks (all not shown) controlled by the access controller.

Figure 3:
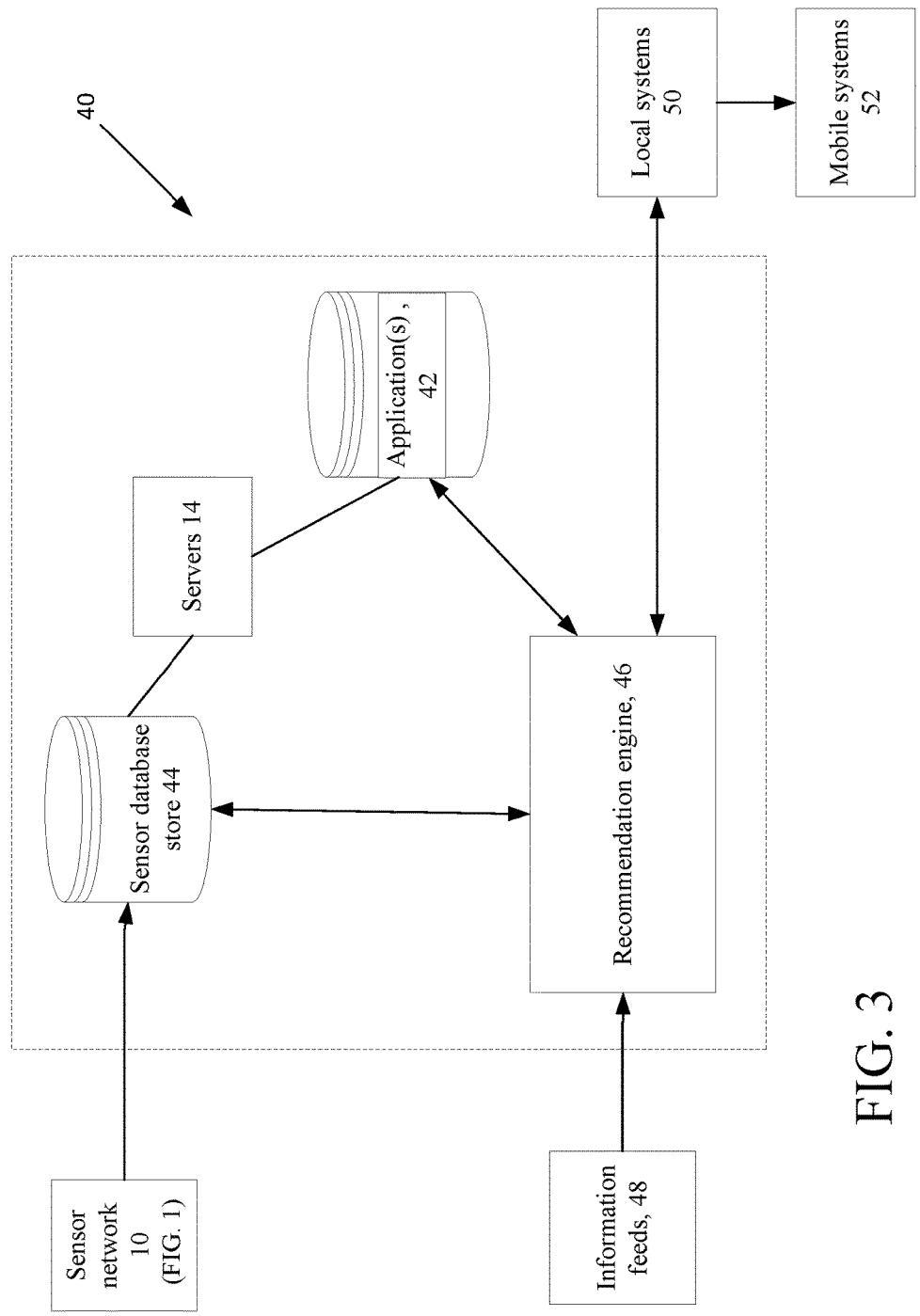
FIG. 3 is a block diagram of a system architecture for a sensor-based dynamic risk event prioritization and recommendation system.

Referring now to FIG. 3, a system architecture for a sensor-based dynamic risk event prioritization and recommendation system 40 (recommendation system 40) is shown. The recommendation system 40 can operate with either a cloud-based set of servers (e.g., servers 14, as shown) or non-cloud based, centrally located servers. The recommendation system 40 executes application(s) 42 that receive sensor data from a large plurality of different premises, some of which may be related in some manner to each other. The sensor data are stored in a persistent database 44.

The recommendation system 40 also includes a recommendation engine 46 that receives information from information feeds, generally 48. The information feeds 48 can include public information feeds such as news, weather reports, traffic reports, law enforcement, government, as well as other sources of data including private data sources such as employee data from a human resources database associated with employees at a particular premises, and location data from systems that track locations of key personnel (for example, but not limited to, company executives) and various public social media data feeds relating to social media, etc. The data from the information feeds 48 can be stored in a information database (not shown).

The application(s) 42 uses data collection and storage subsystems for gathering data that will be used by the recommendation engine 46. The collected data (sensor data from sensor database store 44 and public information data from the feeds 48, etc.) are analyzed using machine learning algorithms. Certain data are tagged or labeled by the system 40 as the data are received or as a post processing step. The large storage system (sensor database 44 and information database) used to store the data is preferably cloud based and could be part of the first tier 12a discussed above.

The recommendation engine 46 retrieves the collected data and performs the designated analysis to generate dynamically updated risk profiles and operational decisions. Those risk profiles and recommended operational decisions are transmitted to local systems 50 at affected, local premises (not shown) and/or mobile systems/devices 52, so that local decisions can be made with respect to the updated risk profiles and suggest operational decisions.

Figure 4:
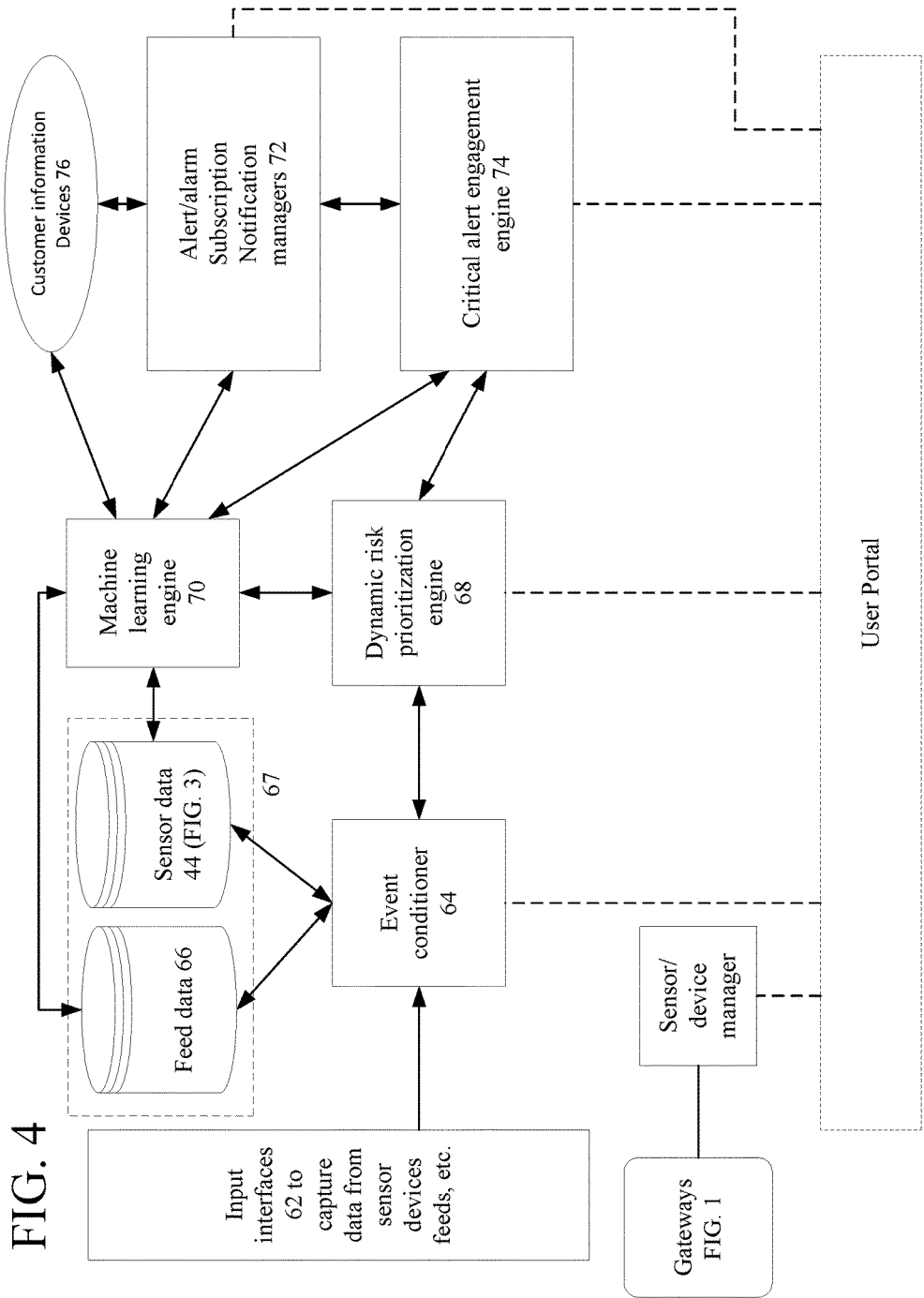
FIG. 4 is a block diagram showing details of the recommendation system of FIG. 3.

Referring now to FIG. 4, a detailed view of aspects of the recommendation system 40 of FIG. 3 is shown. In this view, the recommendation system 40 is shown to include one or more interfaces 62 to capture on a continuous basis input data from sensor devices, feeds, etc. These data are fed directly or as shown through an event conditioner filter 64 to filter out redundant data before being stored feed data storage 66 or sensor data storage 44 (collectively storage 67). The event conditioner filter 64 receives data from and sends data to a dynamic risk event prioritization engine 68. The dynamic risk event prioritization engine 68 sends dynamically prioritized risk event data to a machine learning engine 70 that executes machine learning algorithms. The dynamic risk event prioritization engine 68 and the machine learning engine 70 algorithms feed alert, subscription, notification management engines (collectively 72) and a critical alert engagement engine 74. The notification engine portion of the engine 72 feeds customer information to customer systems/devices 76.

Figure 5:
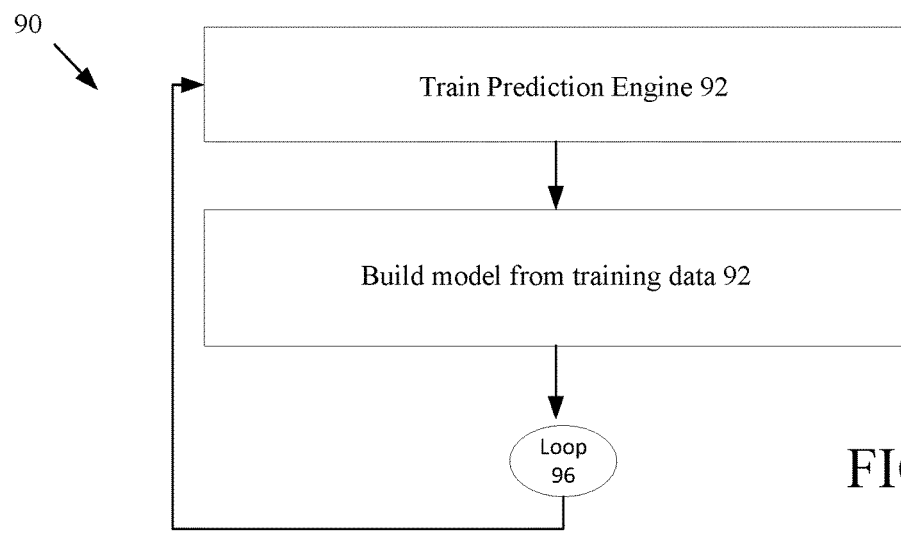
FIGS. 5, 5A and 6 are flow diagrams depicting functional aspects of the system of FIG. 4.

The detailed view of aspects of the system architecture of FIG. 5 also shows a user portal 80. The user portal 80 is a set of applications, for instance web based applications, which allows customers associated with the premises and/or assets within a premises to subscribe to the service, to receive notifications, and to assign an initial risk rating to each premises and/or assets, as determined by the customers.

The risk assignments by the customers are based on each customers' own business rules and are used to generate multifactor risk profiles that are assigned to all assets in a customer's premises. The customer suggests business rules and the system implements these business rules that are assigned to assets, as reflected by the dotted lines from the user portal 80 to the event condition filter 64, dynamic prioritization engine 70 and machine learning engine 68, as well as the alert, subscription and notification manager 72. Dotted lines from the user portal 80 to the event condition filter 64, dynamic prioritization engine 70 and machine learning engine 68, as well as the alert, subscription and notification manager 72 are used to indicate network paths for messages from user systems (not shown) with the messages (not shown) providing influences to the respective engines through the customer suggested business rules, rather than the system directly receiving and implementing these business rules. The customer's business rules can take into consideration various items, such as activities performed in a specific premises, the level and type of people present in that specific premises, the types of materials/products/items stored in that specific premises, etc.

In addition to risk profiles there are events that affect the safety or "riskiness" of the asset. An initial risk level profile system architecture uses the cloud based set of servers 14 or centrally located servers to execute the machine learning algorithms. These machine learning algorithms can be of various types including supervised and unsupervised algorithms that receive the sensor data from premises and public information feeds and from that data makes decisions, especially security related decisions for a particular premises or a set of premises.

Referring now to FIG. 5, machine learning processing 90 for the system is shown. This processing 90 includes training processing 92 and model building processing 94, which can be an iterative process as shown by loop 96. The machine learning processing 90 is used in operation of the sensor based state prediction system 40.

Figure 5A:
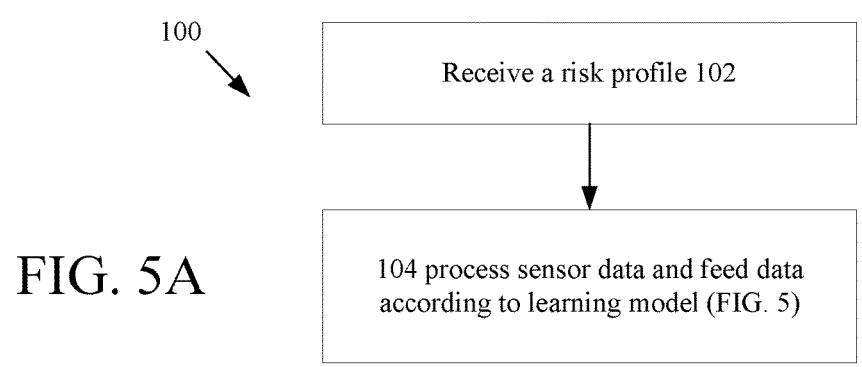

Referring now to FIG. 5A, in general, the recommendation system 40 builds risk profiles. The recommendation system 40 receives 102 a risk profile for a physical premises, processes 104 collected sensor information from plural sensor devices deployed in the premises and with physical objects being monitored by the sensor devices in the premises together with received real-time data feeds relevant to the geographic location of the physical premises. The recommendation system 40 executes one or more learning models (FIG. 5) that continually analyzes the collected sensor information and data feeds to produce operational decisions based on the sensor information and data feeds.

The system in response predicts changes to the risk profile based on the continual analysis of sensor information and determines a new risk profile for the physical premises based on the predicted changes. From the new determined risk profile, the system determines responses appropriate for the new risk profile, produces response messages based on the determined responses and sends the generated response messages to a system/device.

Figure 6:
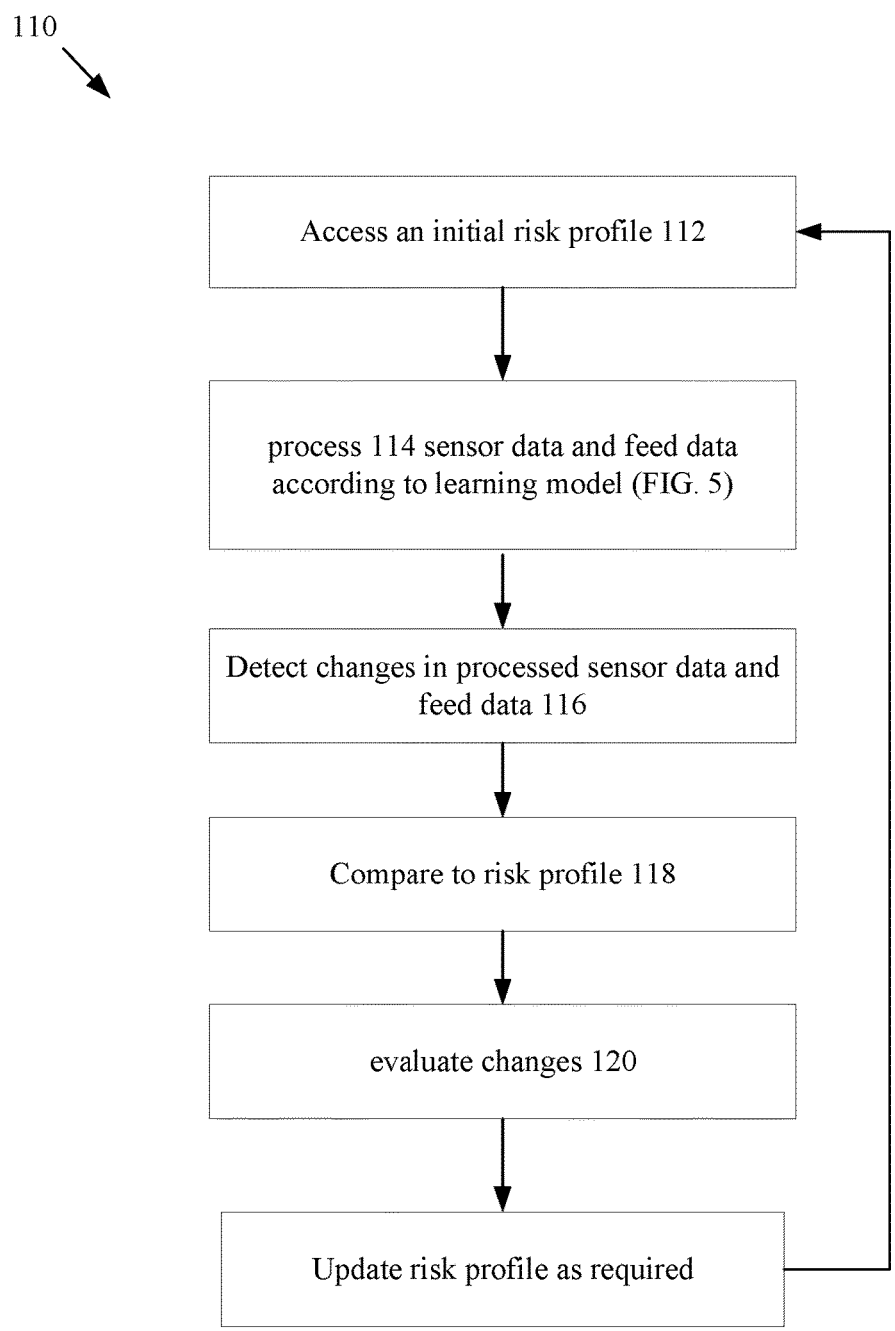

Referring now to FIG. 6, aspects of the risk profile processing 110 on the system of FIG. 3 (and FIG. 4) is shown. The training processing trains the recommendation engine 40 by accessing 112 an initial profile for a specific premises, processing 114 sensor data from that premises and processing the sensor data by the machine learning algorithms, to detect 116 any effects (changes) on the initial profile.

The risk profile processing 110 detects changes in the processed sensor data and feed data and compares 118 to the initial profile and evaluates 120 the changes. The risk profile processing 110 also in addition to detecting changes, predicts changes to a risk level in the risk profile based on the detected changes in the sensor data, as well as, changes in external data. For example, the risk profile processing 110 receives real time weather data from an external service and monitors that data as well as predicted weather patterns. Based on these predictions and/or the sensor data, the risk profile processing 110 may raise the risk level in the risk profile based on a prediction of an event, rather than an actual change in the weather. That is, the risk profile is updated 122 based on an expected change rather than an actual change.

Another example is where there is crime spree in an area against assets that are similar to assets being protected by this system. In that case, the system receives real time new reporting data, and the system evaluates the data against sensor data, etc. and may raise the risk rating in anticipation of the crime spree spreading to the location protected by the system. Therefore "changes" to the risk level can be the result of monitored changes to sensor data, but also can be based on "predicted" or "anticipated changes" based on external data and/or sensor data.

Figure 7:
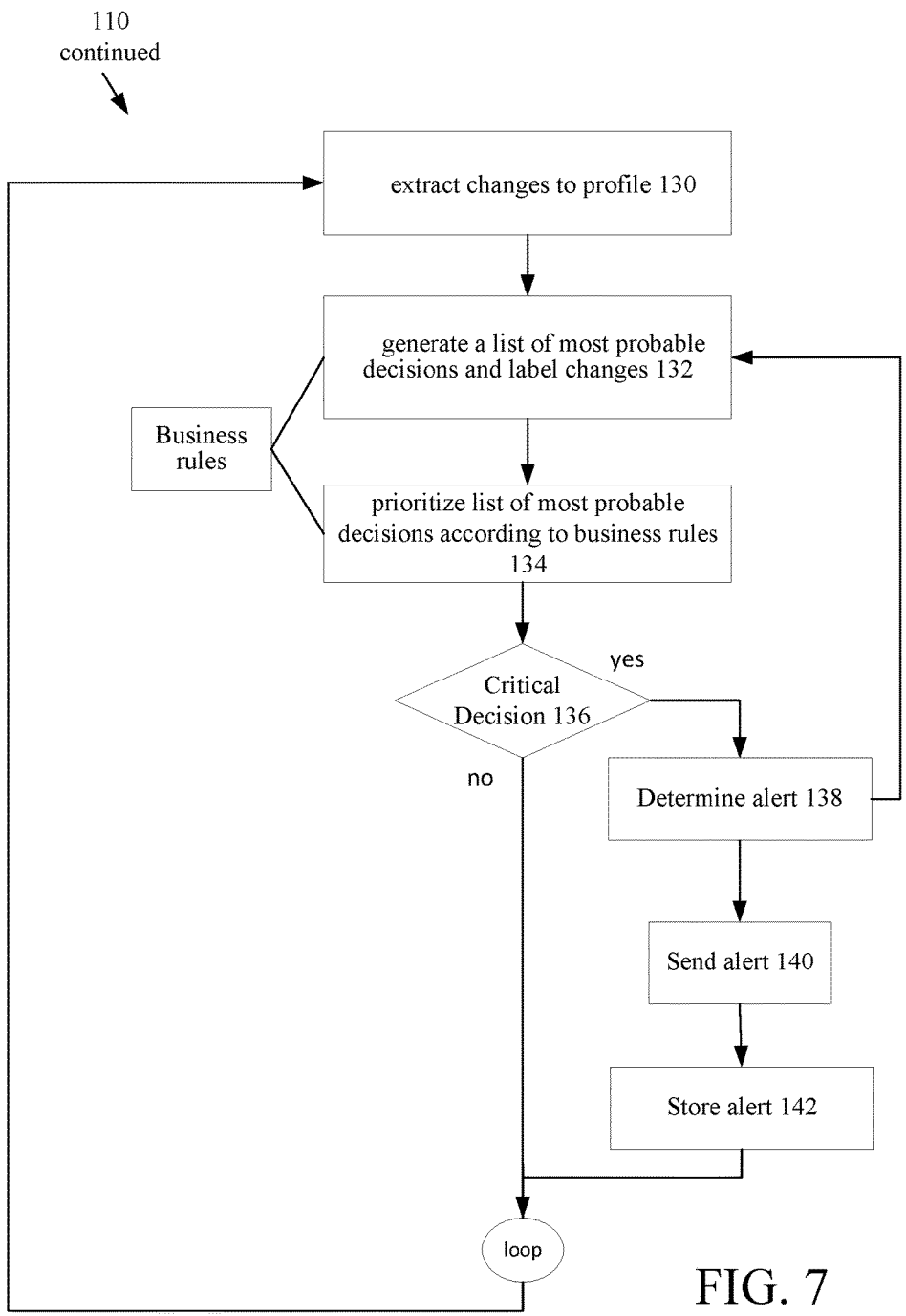
FIG. 7 is a flow diagram of a process to determine a critical decision.

Referring now to FIG. 7, additional aspects of the risk profile processing 110 on the system of FIG. 3 (and FIG. 4) are shown. As described above, the risk profile processing 110 detects changes in the processed sensor data and feed data and compares those changes to the initial profile and evaluates the degree of change. The evaluation of the degree of change can be used as a threshold to determine whether changes can be or should be made to a profile. Typically, a user through the portal could set a threshold or the system could have default threshold changes for each of several parameters. For example, certain parameters can be based on probabilities. For those parameters, a percent change in a range of 1% to 10% for increasing a probability of an event may not be considered significant, whereas a percent change in a range of 10-15% for increasing a probability of an event may be considered significant and percent changes beyond 15% for increasing a probability of an event could be considered very significant.

From the risk processing 110, the system 40 extracts 130 changes (either all or just those that are deemed of significance) generates 132 a list of most probable decisions according to the business rules of the customer and the extracted changes. In some implementations where the machine learning algorithms are unsupervised, the process either manually or automatically labels these detected changes. In other implementations, where the machine learning algorithms are supervised, the process 110 uses these labels supplied with the data to label these detected changes. From the extracted changes, the system determines, when there is a difference whether something unusual has happened in the premises being monitored or whether a normal condition of the premises being monitored is present. With this information the system labels the changes as "no action" or "action" transitions. Either the system or manual intervention is used to label either at the system level or the underlying sensor level.

In some embodiments, the system applies unsupervised algorithm learning models to analyze historical and current sensor data records from one or more customer premises and generates a model that can predict patterns, anomalies, conditions and events over a time frame that can be expected for a customer premises or for a related premises. The sensor based state prediction system 40 produces a list of one or more predicted decisions that may result in on or more alerts being sent to one more user devices as well as other computing system. The prediction system 40 uses various types of unsupervised machine learning models including Linear/Non-Linear Models, Ensemble methods etc.

In either event, the risk processing 110 prioritizes 134 the generated list of most probable decisions according to the business rules of the customer and determines 136 if the decision is critical decision. In the event it is not a critical decision, e.g., according to the customer business rules or other rules, e.g., system default rules, the risk processing 110 can loop. In other situations, where the machine learning algorithms process a critical decision from these detected changes, the system determines 138 the suitable alert, e.g., from the business rules, determines the contact and message, etc. The system sends 140 the determined message as an alert and stores 142 the alert and loops.

Figure 8:
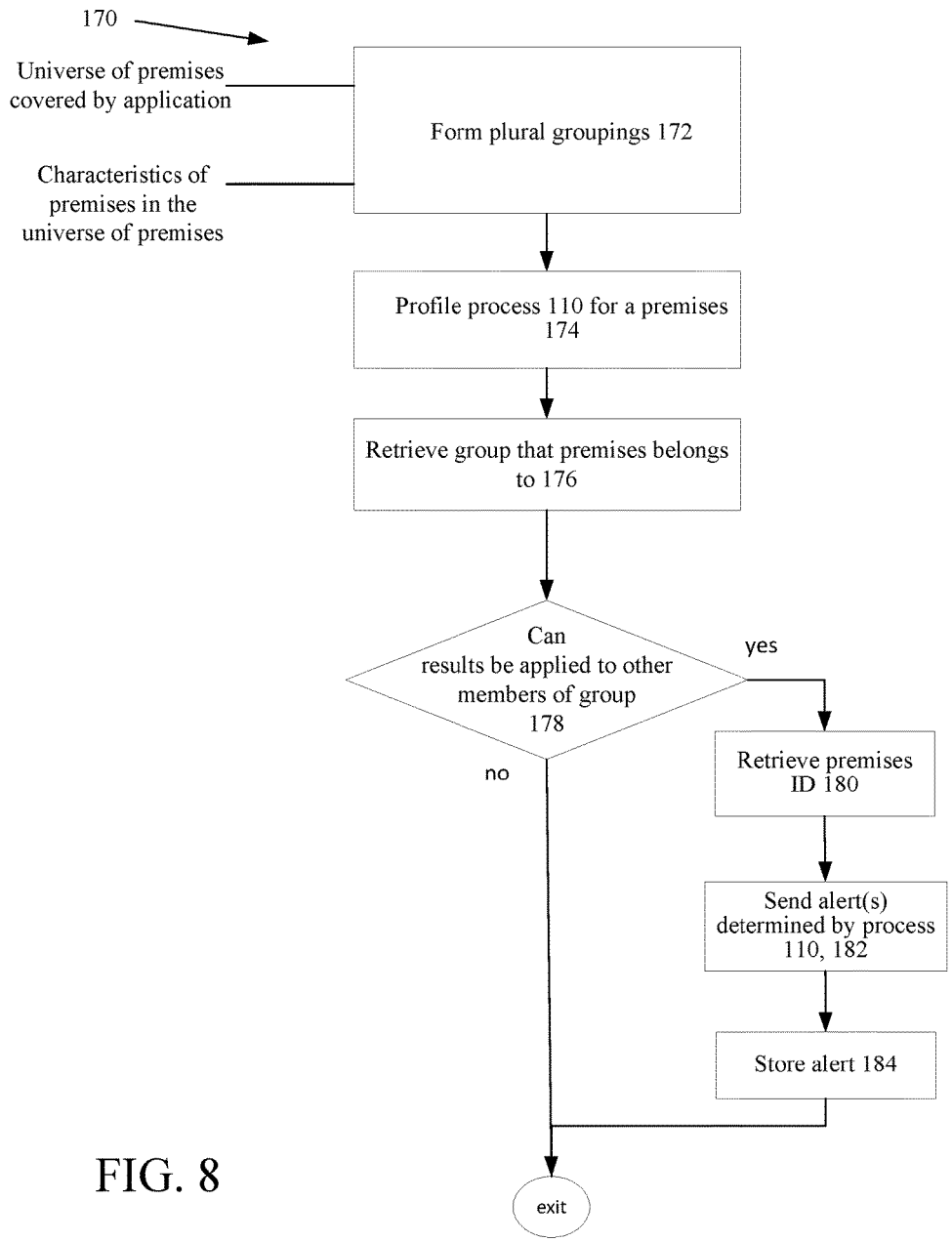
FIG. 8 is flow diagram of affinity processing.

Referring to FIG. 8, while the risk processing 110 processes data from various sensor devices deployed at a specific premises to provide the data on which the risk profile changes and operational decisions for that premises are based.

Another aspect includes group-based risking profiling processing 170 for producing a risk profile and an evaluation of risk to provide operational decisions that can be applied across a grouping of similar situated premises. Applying a produced risk profile and an evaluation of risk with respect to operational decisions is based on determinations made with respect to a non-empty subset that has at least one and may have more than one but not all of the premises in the group. The system executing a group based risk profile processing 170 forms 172 plural groups of premises into risk groupings. Each risk grouping will contain premises grouped according to shared characteristics among the premises. For a given risk grouping, the risk profiles of those premises can be treated as a group for certain risk profile changes and operational decisions.

The risk groups are formed by examining various grouping criteria. Criteria include geographic proximity, similarity with respect to type of premises, e.g., activities carried on in the premises that are the same or similar, similarity with respect to types of operational decisions that would be potentially encountered, similarity with respect to types of sensor devices deployed and similarity with respect to commonality of interests, e.g., ownership or affiliation or other criteria. Any criterion can be used provided that criterion has a bearing on predicting of changes in risk profiles.

Several techniques could be used to form risk groupings. For example, the risk profile processing 170 executes the forming process 172 by computing a Euclidean distance between premises (P) using criteria vectors that represent various criteria attributable to each given premises. The risk profile processing 170 measures the distances between vectors, using differences between the square roots of the sum of the squares of the values of a vector. From the distances, clusters (C) of premises (P) are thus provided, and by using any clustering technique the clusters (C) of premises (P) are grouped together based on the calculated distances. From the formed clusters of vectors V based on the Euclidean distance these clusters are used to segment 83 the entities.

A typical format for a vector is shown below

| Premises ID | Criterion 1 | Criterion 2 | *** | Criterion n |
| --- | --- | --- | --- | --- |

Also shown below is a typical vector having values

| ID value | Value | Value | *** | value |
| --- | --- | --- | --- | --- |

Some criterion can be represented directly as numeric values, whereas others are text values that need to be normalized to numeric values. For instance, presume that criteria 2 is an ownership field, the grouping process can perform a look up of various entities according to a hierarchical structure that stores entity relationships and affiliations. For example, given a Premises 1, assume that the ownership is "XYZ corp." that is assigned a numeric value "125.0." That value is populated in the element of Criterion 2 for a first vector for Premises 1. Next, assume a Premises 23 has an ownership of XWQ corp, which in an access to the hierarchical structure, shows that XWQ corp, is a subsidiary of XYZ corp., with a value of "125.1." The process 172 could chose to ignore this or use it by placing the value into Criterion 2 for a second vector for Premises 23. Conversely, assume that a Premises 54 has an ownership of AWD corp. with no relationship whatsoever to either XWQ corp, or XYZ corp. In that instance the distance could be computed ignoring the Criterion 2 field. In another example, a Premises 78 has the same ownership "XYZ corp." as XYZ corp. The vector for Premises 78 would have the numeric value "125.0" in the Criterion 2 field. Other arrangements are possible, such as representing non-numeric values, e.g., "ownership" as classes and only the same classes of vectors could be grouped together.

In any event, clustering uses these vectors as "points" in an N-dimensional space and the clustering determines whether a point Pi is close to another point Pi+1 of the same class (which could be another way to deal with ownership and other non-numeric values), by determining the distance between those points as $X=Pi+1-Pi+1$ in the N-dimensional space and comparing the distance X to a threshold value T (calculated or empirical). Clustering determines the distance X between all points, and groups them into the clusters (groups) provided that the distance X between any two points is less than or equal to the threshold value T. Clustering determines the distance X between a point Pi+1 and any point in each existing cluster, compares that distance X to the threshold T and determines whether the point Pi+1 belongs in the existing cluster or a new cluster and does this for all points.

Optionally, for a very large group (with a potential loss of resolution) if a sufficient number of entities were clustered into a sufficient number of groups a centroid is determined for each cluster. Finding a centroid involves finding a point that best represents the cluster, e.g., is at the center of the cluster or which is clustered around the predominant number of points in the cluster. Thus, the clustering algorithm group points into clusters and from the cluster a centroid is found that is used to represent the points and all possible further points in the cluster. The centroid "D," is the point P in N-dimensional space, which along with a determined tolerance, variance or standard deviation represents that particular cluster. The centroid D is that point in the cluster (either calculated or an actual point) that is at the center of all of the points in the cluster. The centroid point D, along with the determined tolerance, variance or standard deviation and the identification of the class corresponding to the cluster is stored in a database. Thereafter the centroid along with the tolerance could be used to segment new entities or other entities from the very large group.

The risk profile processing 110 discussed in FIGS. 6 and 7 is conducted 174 for one of or for each one of the premises in the non-empty subset of premises in a given group. According to how the given group was formed, for instance criteria used, and e.g., similarity with respect to types of sensor devices deployed was not a criteria considered in the grouping, any operations decisions made for the premises in the non-empty subset of premises in the given group can be communicated to other premises in the group. The group based risk profile processing 170, retrieves the group that premises belongs to 176, and determines whether any of the operational decisions or other results can be applied to other members of group 178. If yes, it retrieves the premises ID 180, sends 182 alerts or other results to the premises and stores 184 the alert.

All of the premises in the group thus will benefit from an overall network effect, meaning that some of these other premises can have a full host of sensor devices deployed, such as the first one of the premises, while other premises, such as a second premises, denoted as a specific premises of interest may have only a few of sensor devices of a certain type, deployed or does not have any sensor devices at all deployed.

In other situations, the given group could have been formed using as a criterion grouping according to similarity with respect to types of sensor devices deployed, and any operations decisions made for the first subset of premises can be communicated to other premises in the group. All of the premises in the group would also benefit from an overall network effect according non-empty subset of premises in the given group.

The sensor data coming from the first premises in the group are used to influence the risk profile and operation decisions of the specific premises of interest. In other words, analysis for each of the premises in the group of premises can be provided from analysis of the collected data from the first premises, and this analysis can be used to effect decision in the specific premises.

Thus, some of the criteria could be that the specific premises in the group is geographically close to the first premises and there is a common interest among each of the premises in the group, such that each is similarly affected by predicted risk assessments, such that operational decisions and risk profile changes can be made for the entire group based on the sensor devices at a subset of the specific premises.

Another aspect is that the premises in a group could each have different types of sensor devices deployed. Operational decisions for the entire group can be made by aggregating the sensor data from each of the premises as long as there is a common interest among the premises. For example, some locations in the group could have intrusion detection systems while others have video surveillance systems. While the first location is not recording any forced door alarms, the second location may detect intruders moving about the outside of the building. Accordingly, the risk profile of both locations could be raised and appropriate operational decisions made.

The trained recommendation engine generates the operational decisions. Operation of the system is similar to training but is in general, an on-going process.

The system includes a graphical user interface generator receives data from the recommendation engine and generates a graphical user interface that is rendered on a display device of a client system/device. Several different graphical user interfaces can be generated.

The system produces responses that are directives for actions, as a result of changes to risk levels in a profile. For example, giving the two examples above, as the system detects changes in the risk level, the system access business rules to generate a response to the detected changes.

For example, when the system raises the risk level based on detected changes in real time weather data depending on the risk level change the system generates system control response messages that control other systems. These system control response messages can be based on the system evaluating business rules with respect to protected premises. These actions can be control messages to systems that control automatically deployable storm shutters, e.g., for high winds, to systems that prohibit parking on roof levels of parking garages for anticipated snow.

In the crime spree example, when the system raises the risk level based on detected changes in real time news reporting data depending on the risk level change, the system generates system control response messages that control other systems. These system control response messages can be based on the system evaluating business rules with respect to protected premises. These system control response messages include instructions to perform designated actions by systems. Such systems can be access control systems, systems that control automatically deployable gates, doors, etc. systems that control signs, etc. to secure a physical premises, e.g., a corporate facility to at a higher level of security.

Other responses can be action type responses, rather than systems control responses. Action type responses generate action type response messages typically with instruction on how users should physically respond to the event. For example, the response to certain changes in risk level is changed based on the level of the risk profile. For example, forced door alarms are responded to in a more immediate way when an HR feed indicates that an executive is present in the building compared to when there are no executives present. Another example is the way an intrusion alarm is responded to when a warehouse is full of merchandise compared to when the warehouse is empty. In this case sensor devices in the warehouse can detect the presence or absence of merchandise and feeds can provide information to the system to indicate relative value of the merchandise.

In the exemplary use cases discussed below, either the system control response message type or the action type messages (or both) are generated based on changes in the risk level. Typically, the system control response messages are control messages that are sent to devices and/or systems that control equipment. Examples of such equipment include automatically deployable gates, doors, electronic signs, etc. as mentioned above. Whereas, action type response messages are messages with detailed instructions for user(s) on how to respond to an event and are typically sent to user devices, rather than systems that control equipment. Of course given the type of event both types of messages can be provided. The sever accesses a file that includes IP addresses for devices and/or systems to which the various types of messages are directed.

Exemplary Use Cases

Exemplary use cases include access control. Consider that an access control card is found/acquired by unauthorized user. The unauthorized user tries multiple doors in a company's facility, i.e., targeted premises to find one that opens. Access control system data resulting from these attempts are sent to the cloud application that identifies the multiple unsuccessful access attempt by card reads from sensor devices on access card reader devices. The cloud application processes these data and as a result determines a decision that is a recommendation to raise the risk profile of the targeted premises and other related premises that are located in a defined radius of the targeted premises, and notifies building managers and security personnel. The system also generates the operational decision to require secondary verification for all doors at both locations and initiates emails to all authorized users whose cards are used to open doors to verify they were the ones using the card. Those actions are either automatically initiated by the system or by local building management personnel in response to notification from the system.

A second use case can involve a gunshot detector or a microphone with software tuned to recognize gunshots. In this example gunshots are detected through a smart phone application on a cell phone. The cell phone sends a signal to the monitoring center and the system automatically raises the risk level in a geo-fenced area based on the location of the gunshot. The system automatically sends alerts to law enforcement.

Thus the system dynamically and in near real time or in real time identifies and produce macro security events. Using the same inputs and techniques described above the system analyzes event patterns and sensor data patterns to expose macro security events that require immediate action.

For example, many door held open alarms that occur right after several denied entry events may signal that an intruder has access to a secure area. Note that the dynamic risk capability described above is used to prioritize the macro event and to recommend the action that should be taken.

Conversely, as the system detects that events which elevated the risk level have disappeared, the system generates system control response message type or the action type messages (or both) to return a premises to a normal state. The system would accomplish this return to the normal state for a premises according to evaluation of business rules.

Various combinations of the above described processes are used to implement the features described.

The recommendation system 40 of FIG. 4, including the event prioritization and recommendation engine 68 (FIG. 4) can be implemented as a "virtual" system. In one implementation, the recommendation system 40 would have in the event prioritization and recommendation engine 68 a virtual security control center (VSCC) provided by a AI engine.

Figure 9:
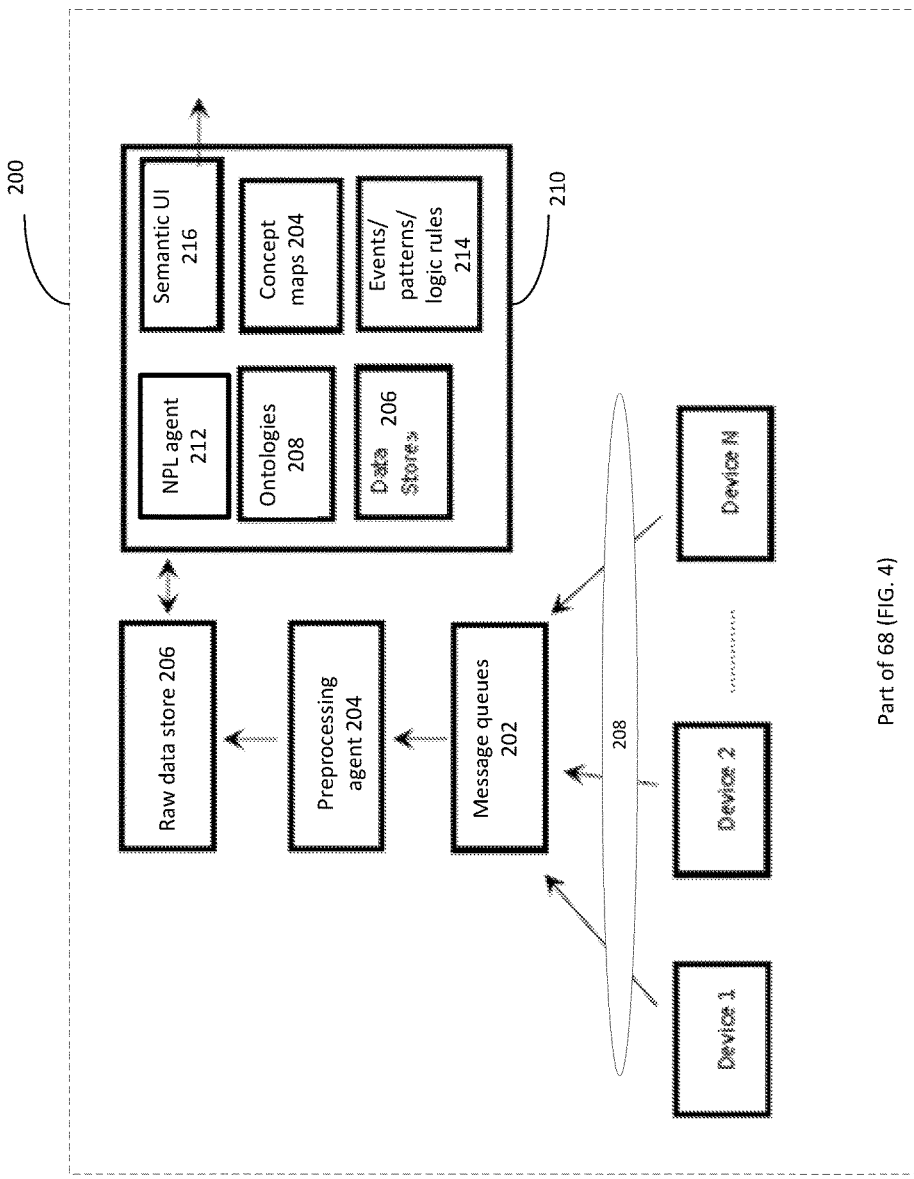
FIG. 9 is a diagram depicting details of NLP processing.

Referring now to FIG. 9, an embodiment of a (VSCC) system is shown. The VSCC 200 includes a NLP engine 210 an artificial intelligence (AI-based) engine, message queues 202, a preprocessing agent 204, event databases 206, and interfaces 208 to a network of devices, and so forth. The VSCC 200 is hosted on a server computer or distributed over multiple server computers, and thus minimizes need for human oversight and associated physical facilities, by reduced operations costs of a security control center (SOC).

The above sub-systems or elements of the VSCC 200 to implement aspects of the business rules for the recommendation engine 40 will be further described. The message queue or set of integrated queues 202 store data/messages from devices 1-n. The set of distributed devices (are generally located around the world) are capable of pushing sensor updates and/or status notices (e.g., as a published web service) to the message queue 202 or queues. The sub-systems or elements of the VCSS 200 also include a parsing agent or set of agents that perform pre-processing 204 of the messages in the message queue 202, and stores the messages and results of the pre-processing in a database 206 (raw data store) accessible by the AI agent 210.

For example, the VCSS 200 can use as a store a NoSQL database (a "non SQL" or "non-relational" database that stores and retrieves of data using a model other than tabular relations used in relational databases) with Extensible Markup Language (XML) or JavaScript Object Notation (JSON) tagged data items, and a database or "raw data store."

In an embodiment of the NLP engine 210, the NLP engine 210 includes an NLP (natural language processing) agent 212 and components that comprise internal agent architecture. The NLP engine 210 includes various internally managed data stores 216 that are structures to store data. The NLP engine 210 includes concept maps 214 to sensor devices and their capabilities and ontologies 218. The AI engine 210 includes the NLP agent 212 as either the primary part of the AI engine or as a human-friendly interface to some other type of analytical engine to apply the rules 224 required to define and identify security breach events based on stored or learned patterns and events.

The system uses the AI engine 210 for monitoring of a large number of sensor devices and other security devices to recognize, with great fidelity, the occurrence of real security breaches. The AI engine includes a conversational module (semantic UI) 226 for facilitating interaction between a human expert and the NLP based AI engine to review events and improve the rules applied by the agent to identify security breaches. Each NLP agent 212 can communicate using web-based conversations among multiple ones of the NLP agents to mutually improve their collective set of breach identification rules.

Another sub-system or element of the VCSS 200 is a rule update and notification web service to inform a collection of NLP agents regarding new or updated rules (as in the case where, for example, the NLP agent 212 and its human security expert overseers discover a new security breech type and the rule or rules by which it may be identified).

The NLP agent 212 is configured to determine anomalous events and ask, through an interface to a human for additional information to confirm a security breach. Since the engine understands the information provided by sensor devices in general, the engine can suggest additional sensor devices for situations where complete information is not provided by existing infrastructure. The NLP agent 212 can determine whether insufficient data is present in order to render a result and thus form and send one or more queries other NLP agents or functions within a building for additional information. For instance, a video stream could be used to detect intrusion and the NLP agent 212 could query a door access reader for the badge used to enter the space. The NLP agent 212 may suggest additional rules based on various events that were not initially programmed into the agent but which were discovered by execution of unsupervised learning algorithms. The NLP agent 212 may suggest that rules are incorrectly implemented. For instance, motion detection could be triggered by a certain size object. However, the size may be so large that the detector is never triggered. The agent could detect the motion and realize that the rule may be incorrectly formed. The agent may suggest new rules based on information gathered an event that correlates to an existing rule and provides additional event verification.

Security breaches are often difficult to detect, particularly in cases where sub-system input and output data is not "human readable." For example, a sensor device of some type may give output data of a certain type with a certain frequency at one time, and then later this type and/or frequency may change. A human security expert tending the SOC would not be able, in general, to detect this change by reviewing raw data (being lost in the complexity and massive extent of the data). A "data crawler" or "scraper" engaged in automated review of the data and applying a set of event recognition rules would be able to recognize the change if in fact a rule or rules existed to identify the change.

For simple events (like a temperature exceeding a threshold, or a door switch going from closed to open while the alarm status is "armed") the rules are clear.

However, rules to detect security breaches are generally not obvious since the change in operation of compromised devices may be very subtle. These rules are most likely to be discovered as a result of comparisons of data patterns from healthy and compromised devices.

These comparisons may involve multiple tests suggested by human experts "in conversation with" the artificial intelligence agent. This makes NLP-based agents ideal for the iterative development of and application of event identification rules.

The system includes the open-ended training of the NLP agent 212 by which the agent 212 is told to monitor various web-based information sources which deal with security breach identification. For example, the agent may be told of a website (or discover the website on its own, using standard web crawler technology) which periodically publishes news on certain types of wireless sensor network security failures.

The NLP agent 212 may include news articles from this website in its general memory and use these as resources in answering questions of the human expert when the human agent and NLP agent 212 discuss security issues together in the development of new event recognition rules. Also, the NLP agent 212 may include analogy based inference logic (known to those skilled in the art of producing AI agents) which can be used by the NLP agent 212 to review news and autonomously hypothesize new rules (for later verification and sanction by the human experts).

Much of the description of this embodiment has been simplified to avoid unnecessary complexity and confusion. For example, the simple message queue 202 would, in most real-world implementations, use a distributed cloud-oriented message queue 202 such as "Apache Kafka" an open-source message broker developed by the Apache Software Foundation. The database used by the NLP agent 212 would probably be a commercial version of a NoSQL database such as Cassandra (Apache) or Mongo (a cross-platform document-oriented database by MongoDB Inc.) or Hadoop (Apache). The NLP agent 212 may in some embodiments have control over the behavior of the pre-processor agent. That is, the NLP agent 212 may decide what format data may take in the raw data store, so as to facilitate the use of the raw data store by the NLP agent.

Not shown in the figure are the details of the reporting chain that the NLP agent 212 uses to publish the occurrence of a security breech when one has been identified. Also not shown in the figure is an embodiment where a special analytics engine or agent is interposed between the NLP agent 212 and the raw data store. In this case the analytics engine applies the rules used to recognize events. Otherwise (i.e., when the analytics engine is not present), this function is internal to the NLP agent.

Servers interface to the sensor based state prediction system 50 via a cloud computing configuration and parts of some networks can be run as sub-nets. In some embodiments, the sensor devices provide in addition to sensor data, detailed additional information that can be used in processing of sensor data evaluate. For example, a motion detector could be configured to analyze the heat signature of a warm body moving in a room to determine if the body is that of a human or a pet. Results of that analysis would be a message or data that conveys information about the body detected. Various sensor devices thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensor devices to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Program instructions stored in the memory, along with configuration data may control overall operation of the system. Servers include one or more processing devices (e.g., microprocessors), a network interface and a memory (all not illustrated). Servers may physically take the form of a rack mounted card and may be in communication with one or more operator terminals (not shown). An example monitoring server is a SURGARD™ SG-System III Virtual, or similar system.

The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory. Tangible, physical hardware storage devices and computer readable storage media are defined as non-transitory media.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer program product tangibly stored on a computer readable hardware storage device, the computer program product for detecting conditions at a physical premises, the computer program product comprising instructions to cause one or more circuits to:

generate a risk profile for the premises, the risk profile comprising risk levels assigned to assets in accordance with a set of business rules;

collect sensor information from a plurality of sensor devices deployed at the premises, wherein the sensor devices monitor the assets;

receive data feeds relevant to a location of the premises;

execute one or more learning models to continually analyze the sensor information and the data feeds to update the risk levels based on the sensor information and the data feeds;

produce an operational decision for one or more of the assets based on updates to the risk levels; and provide the operational decision to personnel associated with the premises.

2. The computer program product of claim 1, wherein the instructions further cause the one or more circuits to:

receive the data feeds from a plurality of sources comprising at least a news source and a weather source.

3. The computer program product of claim 1, wherein the instructions further cause the one or more circuits to:

detect changes in the sensor information and the data feeds;

evaluate the changes with respect to the risk profile; and generate a list of most probable operational decisions.

4. The computer program product of claim 3, wherein the learning models are unsupervised, and the instructions further cause the one or more circuits to:

apply labels to the detected changes.

5. The computer program product of claim 3, wherein the learning models are supervised, and the instructions further cause the one or more circuits to:

apply labels to the sensor information and the data feeds.

6. The computer program product of claim 1, wherein the instructions further cause the one or more circuits to:

generate a response message comprising instructions to control one or more of the assets; and send the response message to the one or more assets to control operation of the one or more assets.

7. The computer program product of claim 1, wherein the instructions further cause the one or more circuits to:

execute a process to monitor the sensor devices to recognize occurrences of real security breaches associated with the premises.

8. A system comprising:

a plurality of sensor devices installed at a physical premises;

a gateway that couples the sensor devices to a network;

a server computer comprising a processor and a memory, the server computer coupled to the network and in communication with the gateway;

a storage device storing a computer program product for detecting conditions at the premises, the computer program product comprising instructions to cause one or more circuits of the server computer to:

generate a risk profile for the premises, this risk profile comprising risk levels assigned to assets in accordance with a set of business rules;

collect sensor information from the sensor devices installed at the premises, wherein the sensor devices monitor the assets;

receive data feeds relevant to a location of the premises;

execute one or more learning models to continually analyze the sensor information and the data feeds to update the risk levels based on the sensor information and the data feeds;

produce an operational decision for one or more of the assets based on updates to the risk levels; and provide the operational decision to personnel associated with the premises.

9. A system comprising:

a plurality of sensor devices installed at a first physical premises;

a gateway that couples the sensor devices to a network;

a server computer comprising a processor and a memory, the server computer coupled to the network and in communication with the gateway;

a storage device storing a computer program product for detecting conditions at the first premises, the computer program product comprising instructions to cause one or more circuits of the server computer to:

generate a risk profile for the first premises, the risk profile comprising risk levels assigned to assets in accordance with a set of business rules;

collect sensor information from the sensor devices installed at the first premises, wherein the sensor devices monitor the assets;

receive data feeds relevant to a location of the premises;

execute one or more learning models to continually analyze the sensor information and the data feeds to update the risk levels based on the sensor information and the data feeds;

produce an operational decision for one or more of the assets in accordance with updates to the risk levels;

identify a second physical premises that shares one or more characteristics with the first premises; and provide the operational decision to personnel associated with the first premises and personnel associated with the second premises.

10. The computer program product of claim 1, wherein the premises comprises a first premises, and the instructions further cause the one or more circuits to:

identify a second physical premises that shares one or more characteristics with the first premises; and provide the operational decision to personnel associated with the second premises.

11. The computer program product of claim 10, wherein the instructions further cause the one or more circuits to:

identify a third physical premises that shares one or more characteristics with the first premises and the second premises; and form a grouping comprising the first premises, the second premises, and the third premises; and provide the operational decision to personnel associated with the third premises.

12. The system of claim 8, wherein the premises comprises a first premises, and the instructions further cause the one or more circuits to:

identify a second physical premises that shares one or more characteristics with the first premises; and provide the operational decision to personnel associated with the second premises.

13. The system of claim 12, wherein the instructions further cause the one or more circuits to:

identify a third physical premises that shares one or more characteristics with the first premises and the second premises; and form a grouping comprising the first premises, the second premises, and the third premises; and provide the operational decision to personnel associated with the third premises.

14. The system of claim 8, wherein the instructions further cause the one or more circuits to:

receive the data feeds from a plurality of sources comprising at least a news source and a weather source.

15. The system of claim 8, wherein the instructions further cause the one or more circuits to:

detect changes in the sensor information and the data feeds;

evaluate the changes with respect to the risk profile; and generate a list of most probable operational decisions.

16. The system of claim 15, wherein the learning models are supervised, and the instructions further cause the one or more circuits to:

apply labels to the sensor information and the data feeds.

17. The system of claim 8, wherein the instructions further cause the one or more circuits to:

generate a response message comprising instructions to control one or more of the assets; and send the response message to the one or more assets to control operation of the one or more assets.

18. The system of claim 9, wherein the instructions further cause the one or more circuits to:

receive the data feeds from a plurality of sources comprising at least a news source and a weather source.

19. The system of claim 9, wherein the instructions further cause the one or more circuits to:

detect changes in the sensor information and the data feeds;

evaluate the changes with respect to the risk profile; and generate a list of most probable operational decisions.

20. The system of claim 9, wherein the instructions further cause the one or more circuits to:

generate a response message comprising instructions to control one or more of the assets; and send the response message to the one or more assets to control operation of the one or more assets.

* * * * *